United States Patent
Scharpf

(10) Patent No.: US 6,266,976 B1
(45) Date of Patent: Jul. 31, 2001

(54) CRYOGENIC H2 AND CARBON MONOXIDE PRODUCTION WITH AN IMPURE CARBON MONOXIDE EXPANDER

(75) Inventor: Eric William Scharpf, Trumbauersville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/602,720

(22) Filed: Jun. 26, 2000

(51) Int. Cl.[7] .................................................. F25J 3/00
(52) U.S. Cl. ................ 62/621; 62/630; 62/920; 62/931
(58) Field of Search .......................... 62/621, 630, 920, 62/931

(56) References Cited

U.S. PATENT DOCUMENTS

| | | | |
|---|---|---|---|
| 3,886,756 | * 6/1975 | Allam et al. ................ | 62/920 |
| 4,217,759 | 8/1980 | Shenoy ........................ | 62/27 |
| 4,566,886 | 1/1986 | Fabian et al. ............... | 62/11 |
| 5,133,793 | 7/1992 | Billy ............................ | 62/23 |
| 5,351,491 | * 10/1994 | Fabian ......................... | 62/920 |
| 5,609,040 | 3/1997 | Billy et al. ................... | 62/622 |
| 5,832,747 | 11/1998 | Bassett et al. .............. | 62/630 |

FOREIGN PATENT DOCUMENTS

| | | | |
|---|---|---|---|
| 4210638 | 3/1992 | (DE) | C01B/3/50 |
| 3267680 | 3/1990 | (JP) | F25J/3/02 |
| 0755331 | 3/1995 | (JP) | C01B/3/02 |

* cited by examiner

*Primary Examiner*—Ronald Capossela
(74) *Attorney, Agent, or Firm*—Geoffrey L. Chase

(57) ABSTRACT

A process for obtaining purified carbon monoxide from a gaseous mixture of hydrogen and carbon monoxide and one or more additional impurities to be removed by one or more vapor-liquid separation devices is provided which includes the steps of providing a feed stream of the gaseous mixture, cooling and partially condensing the feed stream to partially separate the feed stream into at least one hydrogen rich vapor substream and at least one carbon monoxide rich liquid substream, withdrawing a first and a second substream from one of the carbon monoxide rich substreams, passing the first substream through a first expansion valve to let down the pressure to a pressure nominally the same as that of a vapor-liquid separation device downstream, vaporizing the second substream using a heat exchange device to produce a third substream at a pressure substantially above that of the vapor-liquid separation device, passing the third substream through a work extraction device to provide a substantial portion of all refrigeration for cooling for the process, feeding the third substream to the vapor-liquid separation device, and withdrawing substantially purified carbon monoxide from the vapor-liquid separation device. A similar apparatus is also disclosed.

40 Claims, 6 Drawing Sheets

CRYOGENIC H2 AND CARBON MONOXIDE PRODUCTION WITH AN IMPURE CARBON MONOXIDE EXPANDER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is directed to a process and apparatus for obtaining purified carbon monoxide from a gaseous mixture consisting primarily of hydrogen and carbon monoxide. In particular, the present invention is directed to a process and apparatus for obtaining purified carbon monoxide from a gaseous mixture consisting primarily of hydrogen and carbon monoxide utilizing an impure carbon monoxide expansion step.

In the present invention, at least part of the refrigeration for a cryogenic partial condensation carbon monoxide purification cycle is provided by an impure carbon monoxide expander. In the preferred embodiment, part of a carbon monoxide-rich process liquid from the bottom of the hydrogen stripper column is partially let down in pressure and vaporized against condensing syngas feed and/or condensing carbon monoxide-rich reflux before it is expanded in a turbine to generate refrigeration for the process. After the impure carbon monoxide stream is discharged from the turbo-expander, it is fed to a separation column where it is further purified before it is rewarmed and leaves the plant as nominally pure carbon monoxide product. Existing cryogenic carbon monoxide purification technology uses refrigeration generated by one or more of the following methods: expanding at least part of a $H_2$-rich stream in a turbo-expander, vaporizing externally supplied liquid nitrogen, expanding a recirculating carbon monoxide-rich heat pump fluid in a turbo-expander or Joule-Thompson expansion valve, or expanding a separate, closed-cycle heat pumping fluid in either a turbo expander or a Joule-Thompson expansion valve.

The objective of this invention is to reduce the capital costs and improve the efficiency of a cryogenic condensation cycle HyCO plant producing carbon monoxide and optionally hydrogen and/or syngas carbon monoxide-products. Existing technology uses various other methods of refrigeration that are more costly and/or less efficient.

The difficulties with existing technologies for providing refrigeration relate to the inherent nature of those refrigeration schemes. For example, $H_2$-rich expansion requires an expensive turbo-expander because of the low molecular weight and often high pressure of such available streams. In addition, when a high pressure hydrogen product is required, this stream must also undergo expensive and inefficient recompression as part of such a process. Externally supplied liquid nitrogen refrigeration, while extremely viable for smaller plants where the operating costs are low, is not economical for larger plants. Use of either carbon monoxide-rich, $N_2$, or other gas mixtures in recirculating heat pump cycles is also quite expensive because of the high capital cost of the driving compressors as well as the high operating costs from the inefficiencies inherent in such recycle systems.

The present invention takes advantage of the mismatch of heating and cooling curves in most existing cryogenic partial condensation carbon monoxide purification cycles so as to improve process efficiency. Thus, there is only a negligible increase in external compression requirement with the invention. In addition, since the preferred operating pressure and flow for this invention are relatively modest and since the impure carbon monoxide stream has a moderate molecular weight, the capital cost of the associated impure carbon monoxide expander is also relatively low.

As mentioned in the first part of this section, there are several existing refrigeration schemes for cryogenic process cycles to produce carbon monoxide, hydrogen, and/or syngas.

All of these processes, including the invention described here, have several features in common. They all typically start with a crude syngas feed stream containing primarily hydrogen and carbon monoxide with lower levels of $CH_4$, $N_2$, Ar, and other trace hydrocarbon impurities. This syngas feed stream is cooled and partially condensed to partially separate most of the heavier components from the hydrogen. The $H_2$-rich stream can be washed with a condensed fluid such as $CH_4$ to remove further impurities in what are commonly known as $CH_4$-wash cycles. In these wash cycles, the process refrigeration is most commonly provided by a pure carbon monoxide recycle system integrated with a carbon monoxide product compressor. In cycles without the wash step, commonly referred to as partial condensation cycles, the $H_2$-rich stream is commonly expanded in a turbo-expander for refrigeration (or can be simply rewarmed as is if other refrigeration is provided) before it leaves the cryogenic part of the plant as a crude hydrogen product. This crude hydrogen product is often further purified by pressure swing adsorption (PSA) and is sometimes compressed to final delivery pressure.

The remaining heavier liquid is then separated in one or more columns to remove the residual hydrogen, $CH_4$, and optionally any other relevant impurities. The purified carbon monoxide is itself then rewarmed and typically leaves the cryogenic part of the plant as low pressure carbon monoxide product. This carbon monoxide stream is often compressed to final delivery pressure with part of the carbon monoxide stream sometimes compressed and returned to the cryogenic system to provide column reflux or as a heat pumping fluid.

There are numerous examples of this general purification scheme with various different methods of refrigeration.

One example in U.S. Pat. No. 4,217,759 to T. A. Shenoy describes a typical condensation cycle for separating synthesis gas with several vapor-liquid separators as part of the feed gas cooling to improve the process. In all of the different variations, one of the primary constants is that the refrigeration for the process is provided by expanding one of the $H_2$-rich overhead streams from one of the vapor-liquid separators in a turbine before it is rewarmed and exits the plant.

German Application No. DE 42 10 638 Al by R. Fabian describes a generally similar partial condensation cycle for producing high purity hydrogen and carbon monoxide. Here again, the partially condensed syngas is fed to a vapor-liquid separator and the $H_2$-rich overhead stream is partially rewarmed and turbo-expanded to provide refrigeration to the process.

Fabian, et al. describe a carbon monoxide recycle refrigeration system for a partial condensation cycle in U.S. Pat. No. 4,566,886. In their process, a carbon monoxide-rich liquid stream is taken after flash separation of hydrogen from the partially condensed syngas feed in a series of vapor-liquid separators. This stream is let down in pressure, vaporized, expanded in a turbo expander, and rewarmed to ambient conditions. After rewarming to ambient temperatures, this stream is combined with the low pressure syngas feed to the plant, compressed, and recycled to the cryogenic system through the syngas feed compressor. It is thus important to note that since the carbon monoxide-rich stream passing through the turbo-expander in this prior art is recycled back into the low pressure syngas feed before a recompression step, this essentially constitutes a hydrogen I carbon monoxide heat pump loop.

S. Watanabe and S. Okahayashi describe a partial condensation carbon monoxide purification system in Japanese Public Patent Disclosure Bulletin No. JP 03-267680. Here the refrigeration is provided by a hydrogen-rich stream taken from a partially condensed syngas feed stream after passing through a series of vapor-liquid separators. This hydrogen-rich stream is then expanded in an expansion turbine before it is rewarmed and discharged as hydrogen product.

J. Billy describes a methane wash type hydrogen/carbon monoxide purification cycle in U.S. Pat. No. 5,133,793 where the refrigeration is provided by an external refrigeration cycle. The preferred refrigeration cycle is a purified carbon monoxide heat pump with the carbon monoxide supplied from the purified overhead stream from the carbon monoxide-CH4 separation column.

Japanese Laid Open Patent JP 07-55331 by T. Masayuki and H. Fujita describes a process for producing a controlled composition syngas primarily for ammonia or methanol synthesis. In one embodiment, this process is refrigerated using the liquid fraction from a vapor-liquid separation of the partially condensed feed stream. This liquid fraction is partially let down in pressure across an expansion valve, vaporized in a heat exchanger and expanded further in an expansion turbine to provide refrigeration before it is rewarmed and discharged from the plant as off gas. No pure carbon monoxide or hydrogen streams are produced in this process.

U.S. Pat. No. 5,609,040 to J. Billy and F. Granier describes a partial condensation carbon monoxide purification scheme in which part of the refrigeration is provided by turbo-expanding a mixed stream of primarily methane, nitrogen, and hydrogen. This stream is generated by combining a vaporized methane-rich liquid stream from the sump of a methane removal column, a nitrogen-rich vapor from the overhead of a nitrogen removal column, and a hydrogen-rich vapor from the overhead of a feed gas vapor-liquid separator. Other embodiments turbo-expand just the nitrogen and hydrogen-rich streams and blend in an un-vaporized methane-rich liquid stream down stream of the turbo expander.

U. S. Patent No. 5,832,747 to J. D. Bassett et al describe a partial condensation process and apparatus for the production of carbon monoxide and purified syngas. Here, the refrigeration for the system is provided by turbo-expanding a hydrogen-rich stream generated by partially condensing the feed and taking the overheads from one of a series of vapor liquid separators. After turbo expansion, this hydrogen-rich stream is rewarmed and leaves the process as part of the fuel stream.

It is principally desired to provide a novel process and apparatus for obtaining purified carbon monoxide from a gaseous mixture consisting essentially of hydrogen and carbon monoxide and one or more additional impurities.

It is further desired to provide a novel process and apparatus for obtaining purified carbon monoxide from a gaseous mixture consisting essentially of hydrogen and carbon monoxide and one or more additional impurities that utilizes an impure carbon monoxide expander cycle.

It is further desired to provide a novel process and apparatus for obtaining purified carbon monoxide from a gaseous mixture consisting essentially of hydrogen and carbon monoxide and one or more additional impurities where capital costs are reduced and improved efficiency is achieved.

It is still further desired to provide a novel process and apparatus for obtaining purified carbon monoxide from a gaseous mixture consisting essentially of hydrogen and carbon monoxide and one or more additional impurities where an existing process stream pressure reduction is used for refrigeration without any additional compression required to drive the process.

It is yet further desired to provide a novel process and apparatus for obtaining purified carbon monoxide from a gaseous mixture consisting essentially of hydrogen and carbon monoxide and one or more additional impurities where use of hydrogen rich expansion is not required thereby creating a penalty due to a subsequent pressure swing adsorption system operating less effectively at the lower pressure imposed by an upstream hydrogen-rich expansion.

It is further desired to provide a novel process and apparatus for obtaining purified carbon monoxide from a gaseous mixture consisting essentially of hydrogen and carbon monoxide and one or more additional impurities where expensive additional hydrogen product compression is not required.

It is further desired to provide a novel process and apparatus for obtaining purified carbon monoxide from a gaseous mixture consisting essentially of hydrogen and carbon monoxide and one or more additional impurities where use of carbon monoxide heat pump cycles is not required where the turbo-expanded carbon monoxide must be recompressed in expensive compression equipment before it is either recycled into the cryogenic cycle or discharged from the system as product.

It is still further desired to provide a novel process and apparatus for obtaining purified carbon monoxide from a gaseous mixture consisting essentially of hydrogen and carbon monoxide and one or more additional impurities where no or more limited use of liquid nitrogen is required.

It is further desired to provide a novel process and apparatus for obtaining purified carbon monoxide from a gaseous mixture consisting essentially of hydrogen and carbon monoxide and one or more additional impurities where required capital equipment is reduced as compared with systems in the prior art.

BRIEF SUMMARY OF THE INVENTION

A process for obtaining purified carbon monoxide from a gaseous mixture consisting essentially of hydrogen and carbon monoxide and one or more additional impurities to be removed by one or more vapor-liquid separation devices is disclosed which includes the steps of providing a feed stream of the gaseous mixture, cooling and partially condensing the feed stream to partially separate the feed stream into at least one hydrogen rich vapor substream and at least one carbon monoxide rich liquid substream, withdrawing a first and a second substream from any one or more of the at least one carbon monoxide rich substreams, passing the first substream through a first expansion valve to let down the pressure in the first substream to a pressure nominally the same as that of a first one of one or more vapor-liquid separation devices downstream, vaporizing the second substream using a heat exchange device to produce a third substream at a pressure substantially above that of the first one of the one or more vapor-liquid separation devices, passing the third substream through a work extraction device to provide a substantial portion of all refrigeration for cooling for the process, subsequently feeding the third substream to the first one of the one or more vapor-liquid separation devices, and withdrawing substantially purified carbon monoxide from any one or more of the one or more vapor-liquid separation devices.

The process may further include vaporizing the first substream using a heat exchange device subsequent to passing the first substream through the first expansion valve and prior to introduction of the first substream into any downstream vapor liquid-separation device.

The process may further include substantially reducing the hydrogen concentration of at least a portion of one of the at least one carbon monoxide rich liquid substreams, subsequent to the step of cooling and partially condensing the feed stream of the gaseous mixture.

The step of vaporizing the second substream using a heat exchange device may include using an indirect heat exchange device.

The step of passing the third substream through a work extraction device may include passing the third substream through a turbo expander.

The step utilizing the first one of the one or more vapor-liquid separation devices may include utilizing a distillation column as the vapor-liquid separation device.

The step of withdrawing the first and the second substream from any one or more of the at least one carbon monoxide rich substreams may include forming the first and second substreams from a single one of the at least one carbon monoxide rich substreams.

The process may further include the step of passing the second substream through a second expansion valve to let down the pressure of the second substream prior to the step of vaporizing the second substream.

The process may also include the step of obtaining and withdrawing purified hydrogen from the hydrogen rich vapor substream.

The process may also include the step of purifying at least a portion of the hydrogen rich vapor substream in a hydrogen purification unit. The step of purifying at least a portion of the hydrogen rich vapor substream in a hydrogen purification unit may also include purifying at least a portion of the hydrogen rich vapor substream in a pressure swing adsorption unit.

The process may also include the step of removing water, carbon dioxide and other freezable components prior to the step of cooling and partially condensing the feed stream of the gaseous mixture.

The step utilizing the first one of the one or more vapor-liquid separation device may include utilizing a heavy component removal column. The process may further include the step of providing a light component removal column downstream from the heavy component removal column.

The step utilizing the first one of the one or more vapor-liquid separation device may include utilizing a light component removal column.

The step using a vapor-liquid separation device may include using a light component removal column and may also include a step of providing a heavy component removal column downstream from the light component removal column.

The process may include a step of providing an additional stream of a refrigerant to provide additional refrigeration required by the process.

The step of vaporizing the second substream in a heat exchange device to produce a third substream may include vaporizing the second substream to produce a third substream at a pressure at least 10 percent greater or at least 50 percent greater than the first one of the one or more vapor-liquid separation devices.

An apparatus for obtaining purified carbon monoxide from a gaseous mixture consisting essentially of hydrogen and carbon monoxide and one or more additional impurities to be removed by one or more vapor-liquid separation devices downstream is also disclosed. The apparatus includes a means for providing a feed stream of the gaseous mixture, a means for cooling and partially condensing the feed stream of the gaseous mixture to partially separate the feed stream of the gaseous mixture into at least one hydrogen rich vapor substream and at least one carbon monoxide rich liquid substream, a means for withdrawing a first and a second substream from any one or more of the at least one carbon monoxide rich substreams, a first expansion valve through which the first substream is passed, adapted to let down the pressure in the first substream to a pressure nominally the same as that of a first one of the one or more vapor-liquid separation devices downstream, a heat exchange device for vaporizing the second substream adapted to produce a third substream at a pressure substantially above that of the first one of the one or more vapor-liquid separation devices, a work extraction device adapted to pass the third substream therethrough and adapted to provide a substantial portion of all refrigeration for cooling for the process, a means adapted to feed the third substream to the first one of the one or more vapor-liquid separation devices downstream of the work extraction device, and means to withdraw substantially purified carbon monoxide from any one or more of the one or more vapor-liquid separation devices.

DETAILED DESCRIPTION OF THE INVENTION

This invention relates to a process and apparatus for a cryogenic partial condensation cycle to produce purified carbon monoxide and optionally hydrogen and/or syngas product streams from a feed consisting primarily of hydrogen and carbon monoxide with trace levels of nitrogen and argon or other impurities. Any water, carbon dioxide, or other freezable components are removed further upstream in the overall process.

Syngas is a gaseous mixture consisting essentially of hydrogen and carbon monoxide which, depending upon the level of purity, can contain small amounts of argon, nitrogen, methane and other trace hydrocarbon impurities. Usually, it is obtained by catalytic conversion or partial oxidation of coal, coke, natural gas, or other hydrocarbon feeds. The level of impurities, especially methane and other hydrocarbons in the crude syngas usually also is reduced during the cryogenic separation process.

Figure 1:
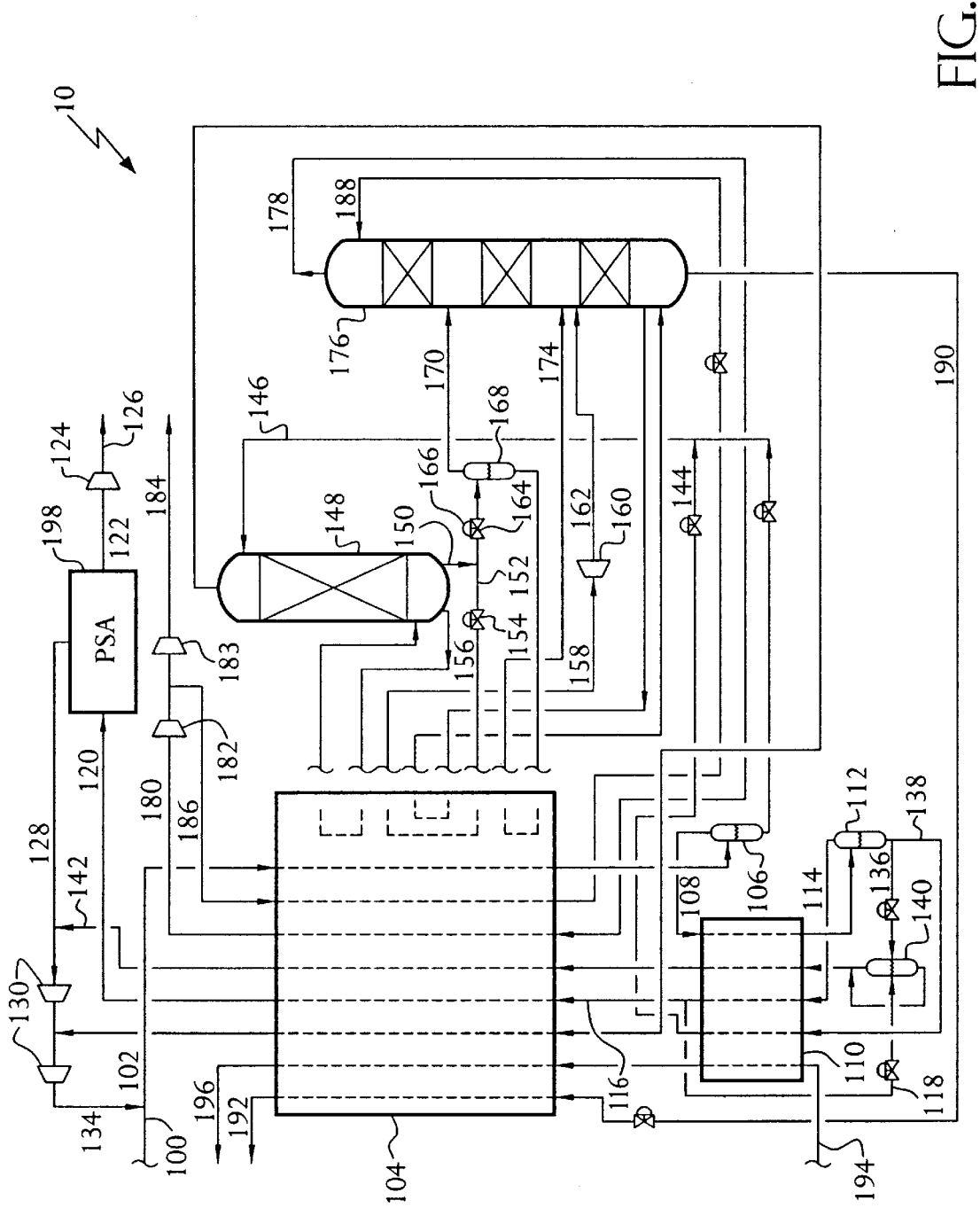
FIG. 1 is a schematic diagram of a process and apparatus for obtaining purified carbon monoxide from a gaseous mixture consisting primarily of hydrogen and carbon monoxide utilizing an impure carbon monoxide expansion step, in accordance with one preferred embodiment of the present invention.

Referring now to FIG. 1, there is shown a preferred embodiment of the system for the process for obtaining purified carbon monoxide from a gaseous mixture consisting primarily of hydrogen and carbon monoxide 10 in accordance with the present invention. The process consists of turbo expansion of an impure carbon monoxide vapor stream 158 downstream of the primary hydrogen removal pots 106, 112 and/or distillation column 148 and upstream of the heavy component removal column 176 to provide a substantial portion of the total refrigeration for the overall cryogenic partial condensation carbon monoxide purification system 10. In the present invention, no part of the turbo expanded carbon monoxide-rich stream is recompressed and recycled to the plant with the syngas feed as part of any heat pump loop.

It is noted that with respect to use of a turbo expander used throughout this specification, any other appropriate work extraction device, for example, a piston expander, may be substituted. Additionally, with respect to use of the distillation devices referred throughout this specification, other vapor-liquid separation devices may be used in which mass transfer of components occur between the phases, including, for example, distillation columns, reboilers and condensers, and vapor-liquid separator pots with or without auxiliary heating or cooling.

The details of the preferred embodiment are as follows with reference to FIG. 1. The overall carbon monoxide and hydrogen purification process of FIG. 1 is primarily for illustration of the preferred application of the invention. It is not meant to limit the invention to this particular configuration of a partial condensation cycle for carbon monoxide and/or hydrogen purification.

Syngas feed 100 enters the plant and is optionally combined with recycled syngas stream 134 before it is partially condensed in a heat exchange device 104 such as a thermal contact heat exchanger, other indirect heat exchanger, or direct heat exchanger. This heat exchange device 104 may consist of several separate units depending on the particular application. The partially condensed stream is separated into vapor and liquid components in vessel 106. The carbon monoxide-rich liquid fraction is let down in pressure and fed along with other streams as reflux stream 146 to a hydrogen removal column 148. The H2-rich vapor fraction 108 is further cooled and condensed in heat exchange device 110. As with heat exchange device 104 this heat exchange device 110 may consist of several separate units.

This colder, partially condensed stream is fed to a second vessel 112 from which a second carbon monoxide-rich liquid and $H_2$-rich vapor are drawn. The vapor 114 is partially rewarmed in heat exchange device 110 and a substream 118 is optionally taken and let down in pressure and fed to a low pressure vessel 140. The remainder of the partially rewarmed H2-rich stream 114 is further rewarmed and is then fed as stream 120 to a hydrogen purification unit such as pressure swing adsorption unit 198 (PSA) to produce a pure hydrogen stream 122. This stream is then optionally compressed to final delivery pressure in compressor 124 and sent to the customer as stream 126. The offgas stream 128 from this purification unit 198 is combined with other streams and compressed in compressor 130 before it is recycled into the syngas feed stream 100 to improve carbon monoxide recovery.

The carbon monoxide-rch liquid from second vessel 112 is split into two substreams 136 and 138. Substream 136 is let down in pressure and fed to low pressure vessel 140. Substream 138 is optionally partially rewarmed, let down in pressure, and fed to the hydrogen removal column 148. Both the liquid and vapor in low pressure vessel 140 are combined and rewarmed in heat exchangers 110 and 104 before they are fed to compressor 130 to become part of the recycled syngas stream 134.

The hydrogen removal column 148 removes the remaining low levels of hydrogen from the various carbon monoxide-rich streams fed to it to produce a hydrogen depleted carbon monoxide-rich stream 150. The $H_2$-rich column overheads are rewarmed in heat exchange device 104 and are combined with the other partially compressed recycle stream and are compressed in compressor 130 to comprise recycle stream 134.

From the perspective of the invention, all of these above operations are simply one preferred method to produce a carbon monoxide-rich stream 150 substantially reduced in hydrogen concentration.

This stream 150 is then split into two substreams 152 and 164. Substream 164 is let down in pressure across an expansion valve 166 to a pressure nominally the same as the downstream heavy component removal column 176. Its resulting liquid and vapor fractions are separated in vessel 168 with the vapor fraction 170 fed to column 176. The liquid fraction is at least partially vaporized in heat exchange device 104 and fed to column 176 as stream 174.

Substream 152 is optionally let down in pressure in expansion valve 154 to form stream 156. This stream is then vaporized in heat exchange device 104 to produce stream 158 at a pressure substantially above that of separator column 176. Stream 158 optionally can be taken as a vapor stream directly from column 148 with any remaining liquid fraction from the column constituting substream 164. It is key to the invention that the pressure of stream 158 be substantially above that of downstream column 176. For the purposes of this invention, "substantially above" means at least 10% greater, and preferably at least 50% greater in absolute pressure. Stream 158 is then passed through a turbo-expander 160 to provide refrigeration for the plant with the discharge stream 162 then fed to heavy component removal column 176.

Column 176 typically removes methane and any other heavy impurities from the carbon monoxide. These heavy components are withdrawn from the bottom of the column as stream 190 and rewarmed in heat exchange device 104 before they leave the plant as stream 192. The overhead purified carbon monoxide stream 178 is rewarmed in heat exchange device 104 and compressed in compressor 182. A substream of this carbon monoxide is withdrawn from the compressor 182, cooled and condensed in heat exchange device 104, and acts as reflux for column 176. Optionally, the remaining carbon monoxide is further compressed by compressor 183 to leave the plant as product stream 184.

In certain options of this invention, a separate light component (i.e. nitrogen) removal column (not shown) may be added either immediately upstream or downstream of column 176. In the case where it is upstream, the turbo-expansion of the impure carbon monoxide will be in reference to the pressure of the added light component removal column rather than the heavy component removal column 176.

In many cases, the turbo-expansion of the impure carbon monoxide stream 158 may not provide 100% of the refrigeration needed for the plant. In these cases, an additional stream of liquid nitrogen or other suitable refrigerant is provided as stream 194 into the cold end of the plant. The spent auxiliary refrigerant exits the plant after it is warmed and/or vaporized in exchangers 110 and 104 as stream 196.

Figure 2:
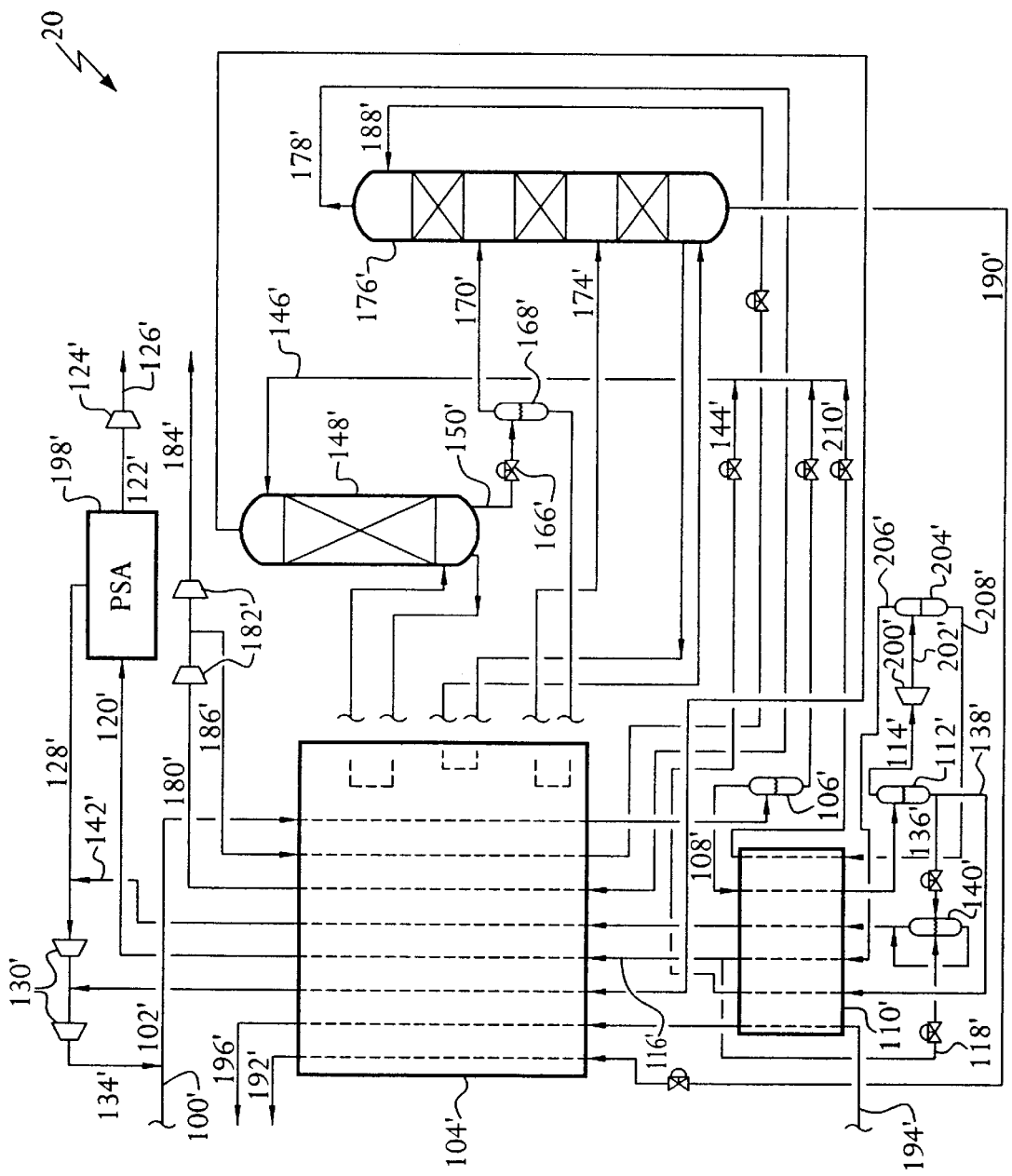
FIG. 2 is a schematic diagram of a prior art system for obtaining purified carbon monoxide from a gaseous mixture consisting primarily of hydrogen and carbon monoxide utilizing $H_2$-rich turbo-expansion refrigeration.

An example of the prior art technology with H2-rich turbo-expansion refrigeration 20 is shown in FIG. 2. The purification aspects are essentially the same as for the embodiment of the invention described earlier except that a $H_2$-rich stream is turbo-expanded to provide the refrigeration. For the purposes of the present application, FIG. 2 depicts similar elements to FIG. 1 with the same reference number but containing a single prime character (') immediately after the reference number. Not each specific element is separately addressed with respect to FIG. 2.

The first main aspect of this differences between the prior art embodiment 20 of FIG. 2 and the present invention of FIG. 1 relates to the fact that impure carbon monoxide turbo expansion is not present in the prior art embodiment of FIG. 2 to provide process refrigeration. In the embodiment of FIG. 2, stream 150' leaving the hydrogen removal column is not split but rather the whole stream is let down in pressure in expansion valve 166' to a pressure nominally the same as the heavy component removal column 176'. The resulting vapor and liquid fractions are separated in vessel 168' with the overhead vapor 170' sent directly to column 176'. The bottom liquid from 168' is vaporized in heat exchange device 104' and enters the column as stream 174'.

Figure 3:
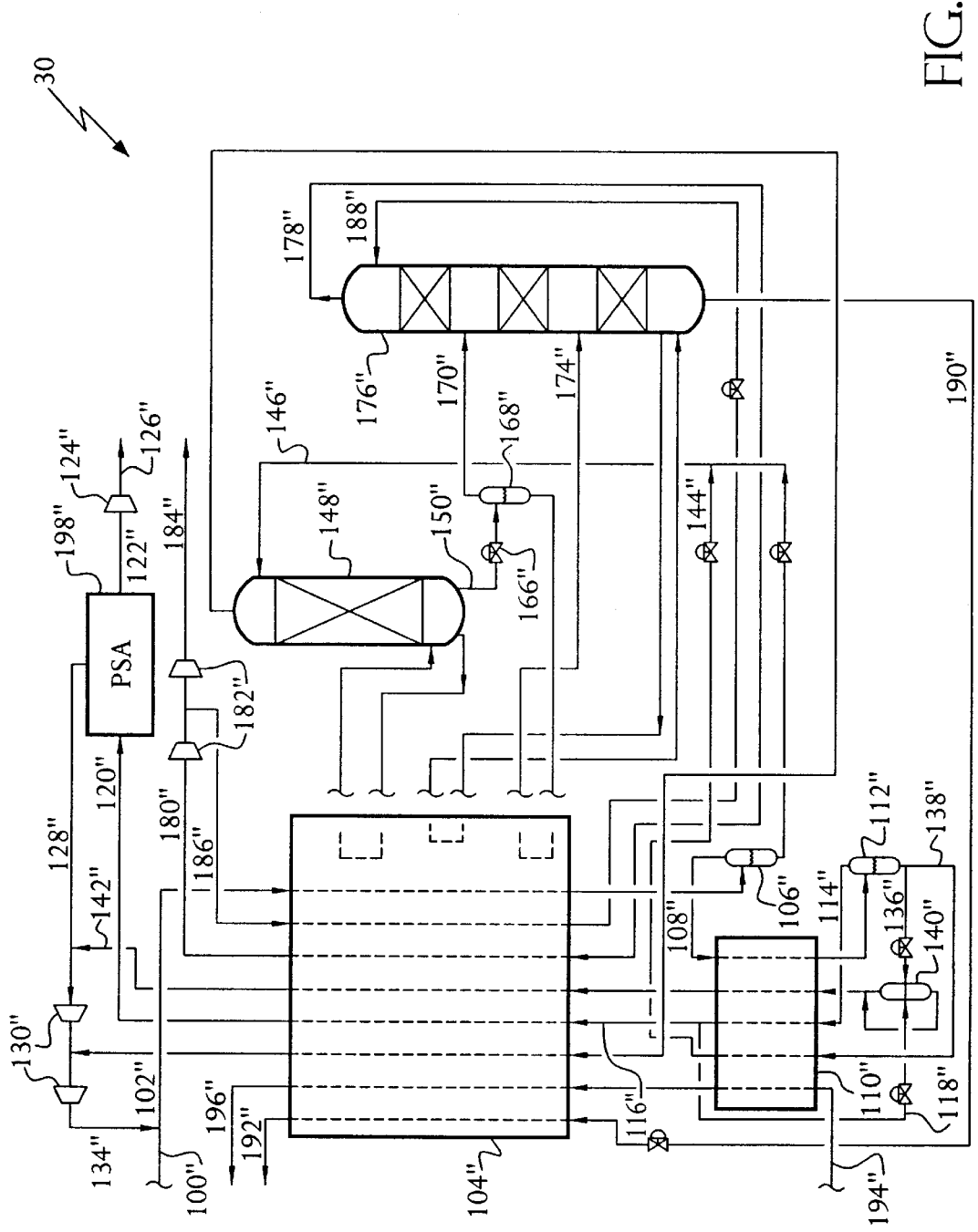
FIG. 3 is a schematic diagram of a prior art system for obtaining purified carbon monoxide from a gaseous mixture consisting primarily of hydrogen and carbon monoxide utilizing external refrigeration such as liquid nitrogen.

The other main difference between the prior art embodiment 20 of FIG. 2 and the present invention of FIG. 1 relates to the fact that the turbo-expansion of a $H_2$ rich stream is present to provide the process refrigeration. In FIG. 2, the $H_2$-rich overheads from vessel 114' is turbo-expanded in expander 200' and the resulting stream 202' is fed to vapor-liquid separator vessel 204'. The carbon monoxide-rich liquid bottoms 208' is optionally partially rewarmed, let down in pressure and fed to the top of the hydrogen removal column 148' with the other carbon monoxide-rich streams. The $H_2$-rich vapor stream 206' is partially rewarmed and optionally a substream 118' is taken, reduced in pressure, and fed to vessel 140'. The remainder of the stream is further rewarmed and sent to a hydrogen purification device such as a pressure swing adsorption unit 198'. The discharge from this device and the remaining purification aspects of the plant are handled similarly as with the invention described earlier. An example of existing technology external refrigeration 30 for this overall process is shown in FIG. 3. For the purposes of the present application, FIG. 3 depicts similar elements to FIG. 1 with the same reference number but containing a double prime character (") immediately after the reference number. Again, not each specific element is addressed with respect to FIG. 3. The purification aspects are essentially the same as for the present embodiment 10 of the invention described earlier except that there is no turbo-expansion device of any kind. Here, stream 194" provides all of the refrigeration requirements for the plant as it is warmed in exchangers 110" and 104". The warm spent refrigerant is then discharged from the plant as stream 196".

The present invention has several benefits over existing technology. The impure carbon monoxide expander cycle is different from the prior art in that an existing process stream pressure reduction is used for refrigeration without any compression required to drive the process. Hydrogen-rich expansions such as the cycle shown in FIG. 2 are penalized because any subsequent pressure swing adsorption (PSA) system operates less effectively at the lower pressure imposed by the upstream expansion. Also, expensive additional hydrogen product compression may also be required. Carbon monoxide heat pump cycles in the prior art are also penalized because the turbo-expanded carbon monoxide must be recompressed in expensive compression equipment before it is either recycled into the cryogenic cycle or discharged from the system as product. External refrigerated cycles such as those with liquid nitrogen (LIN) shown in FIG. 3 do not have the direct capital cost of any heat pump compression but the high cost of the LIN itself reflects the indirect cost of a large heat pump compressor at the original air separation and liquefaction facility as well as any additional transportation costs.

Figure 4:
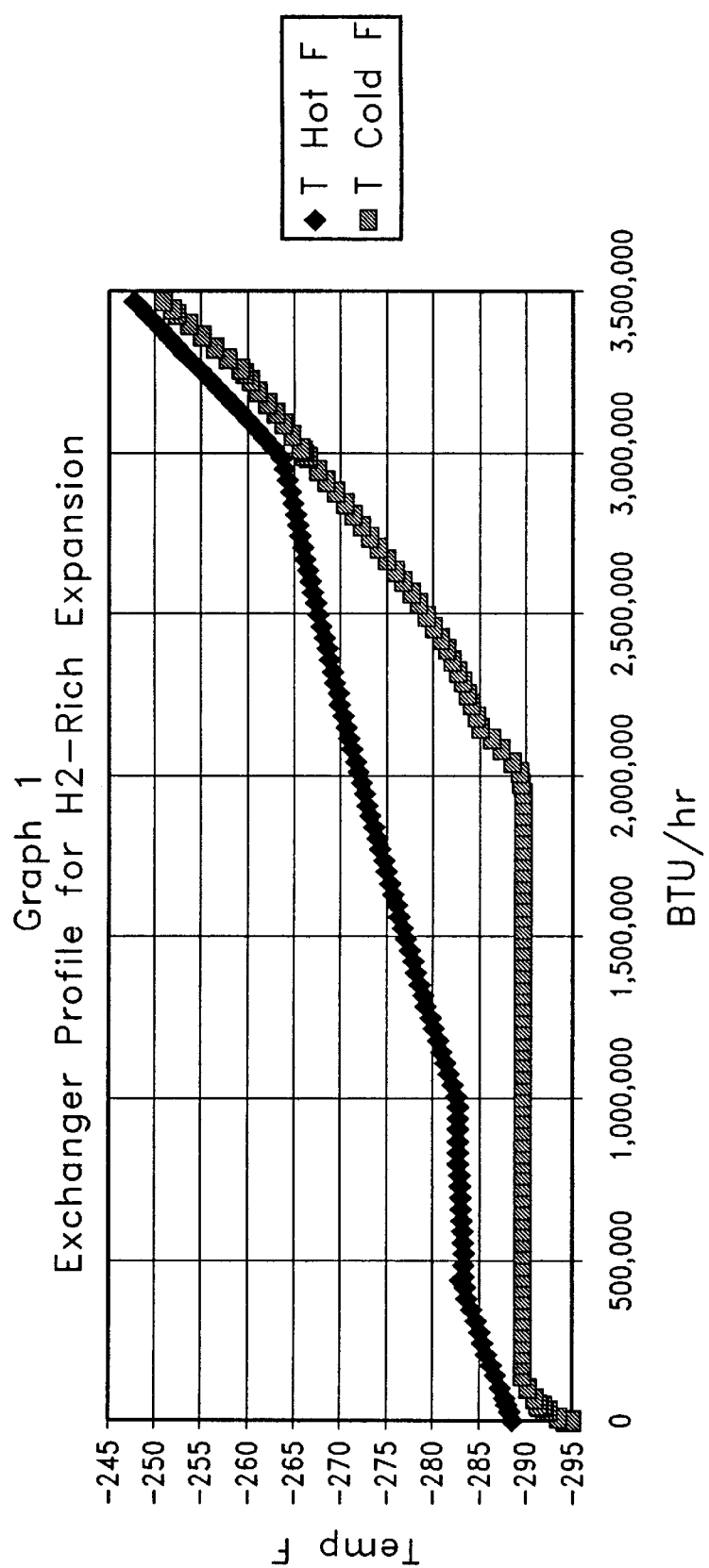
FIG. 4 is a graph of an exchanger profile for an $H_2$-rich expansion of the prior art.
Figure 5:
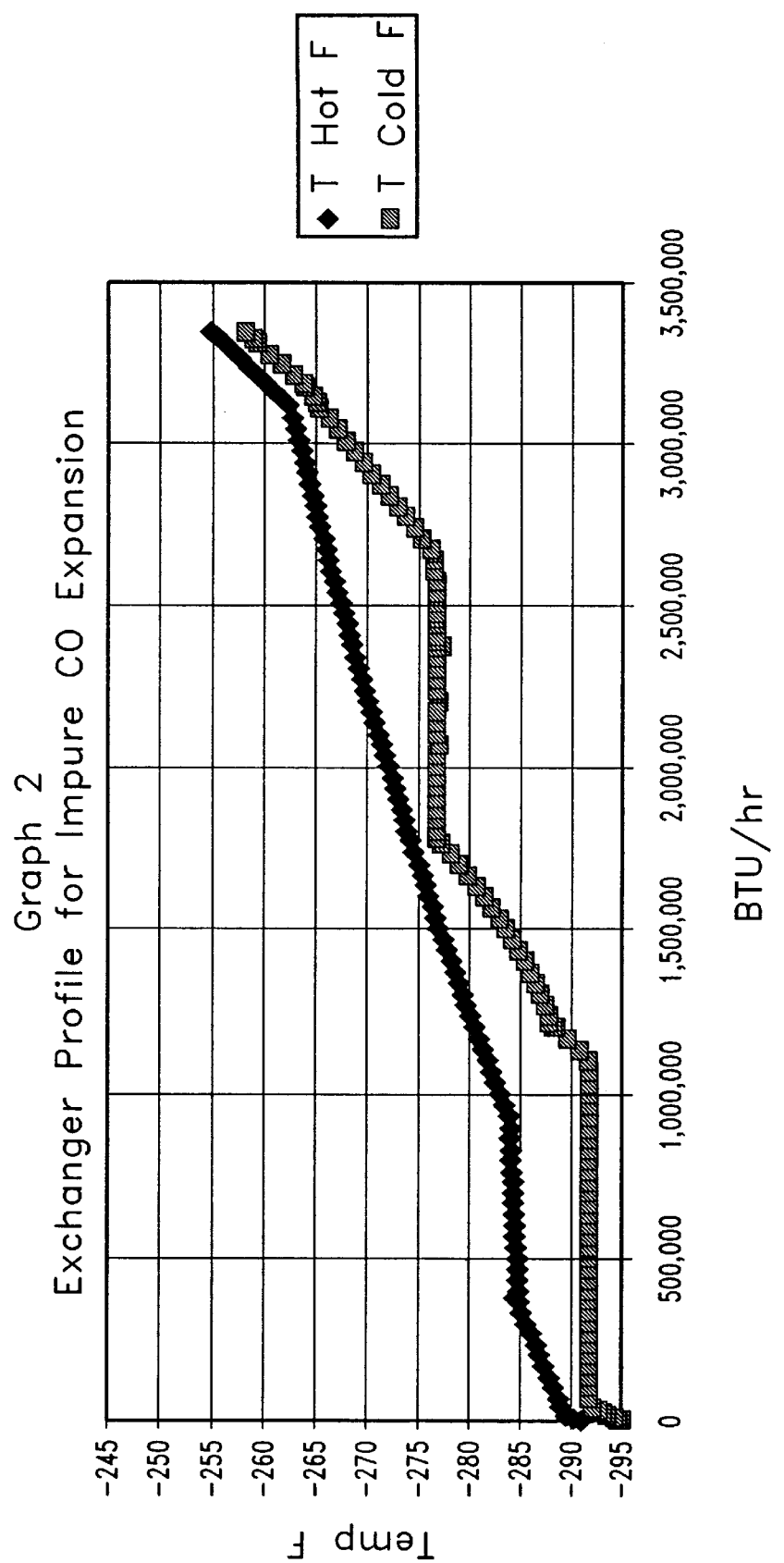
FIG. 5 is a graph of an exchanger profile for impure carbon monoxide expansion in accordance with the invention of FIG. 1.
Figure 6:
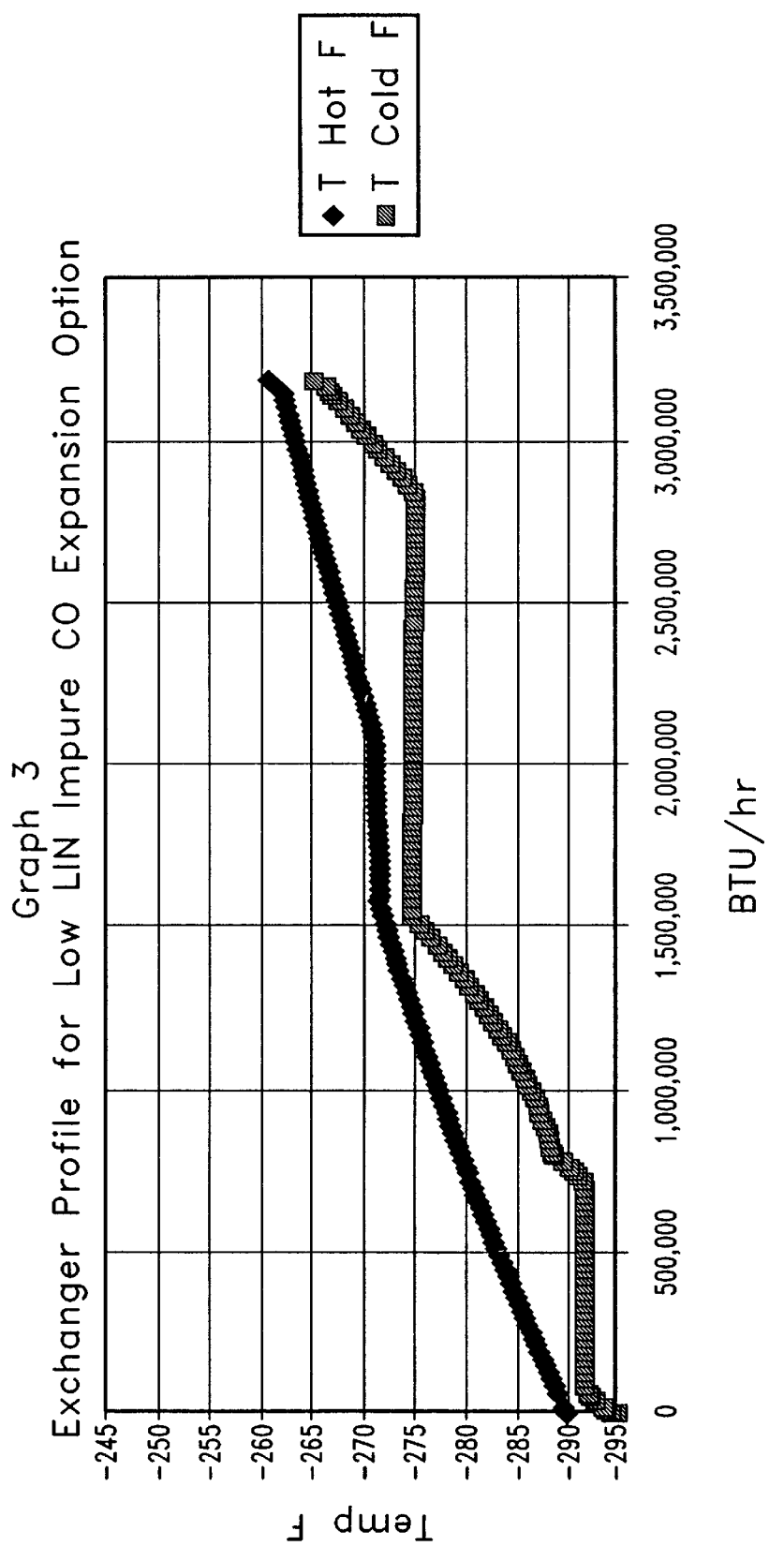
FIG. 6 is a graph of an exchanger profile for a low liquid nitrogen impure carbon monoxide expansion option in accordance with the invention of FIG. 1.

The ability of the invention to escape costly additional compression comes by taking advantage of the existing technology's inefficiencies in the cooling profile in the cold part of the main heat exchanger, as shown in the graphs of FIGS. 4, 5 and 6.

FIG. 4 shows a significant exergy loss in the hydrogen expander cycle. This loss is characterized by the relatively wide gap in the composite cooling curves between the onset of feed condensation at 3,000,000 BTU/hr and the onset of carbon monoxide reflux condensation at 1,000,000 BTU/hr. This gap results from the difficulty in making the best use of the cold side heavy component removal column feed vaporizer refrigeration at −290° F. Thus, there is potential either to make better use of the −290° F. refrigeration present or to take some benefit by increasing the temperature of at least part of that refrigeration.

The current invention takes some benefit from a temperature increase by vaporizing part of the heavy component removal column feed at a higher pressure (and temperature). This allows the higher pressure vapor part of the impure carbon monoxide feed to be expanded before entering the heavy component removal column to generate refrigeration for the cycle as shown in FIG. 1. In the particular case shown in FIG. 5, 44% of the impure carbon monoxide feed is vaporized at 87 psia instead of at the normal 45 psia and is turbo-expanded into the heavy component removal column to generate ~30 hp of refrigeration for the cycle. Thus ~44% of the refrigeration of the heavy component removal column feed vaporizer is degraded from ~290° F. to −277° F. as shown in FIG. 5 without any significant impact on the rest of the cycle. As is clear in FIG. 5, there is much less area between the heating and cooling curves relative to FIG. 4, indicating a more efficient process.

The form this benefit takes in the overall cycle has several parts. The first is that, like an external LIN driven cycle, the crude hydrogen product leaves the cold box at nominal syngas feed pressure. If subsequent PSA purification or additional hydrogen product compression is required, significant capital savings can be made relative to the hydrogen expander case. In the embodiment of the invention presented here, the ~15% lower compression duty relative to the hydrogen-rich expansion technology should translate into significantly lower capital cost.

Another part of the benefit comes in the form of a cheaper expander. The high pressure hydrogen expander used in the existing technology typically operates at very high rpm and is relatively expensive. The lower pressure impure carbon monoxide machine for this option is expected to cost significantly less than the corresponding hydrogen machine.

As with the LIN driven cycle, the expander discharge separator pot is also eliminated, saving further capital relative to the existing hydrogen-rich expander technology at essentially the same operating cost.

Computer simulations of the two examples of the present invention in accordance with FIG. 1, along with two applications of existing refrigeration technology (based on FIGS. 2 and 3) were conducted to provide quantitative estimates of the invention's benefits. The common process conditions for these simulations are summarized in Table 1. The detailed operating parameters for each case along with estimated costs are presented in Table 2. The optimized capital equivalent operating cost shown in the table represents the lowest operating cost achievable for a process cycle expressed as a capital cost using standard economic valuations.

TABLE 1

Nominal Process Conditions

| | |
|---|---|
| Feed Pressure (psia) | 508 |
| $H_2/CO$ | 1.80 |
| $N_2$ + Ar Level (%) | 0 |
| $CH_4$ Level (%) | 0.3 |
| Temp (F.) | 104 |
| Total Feed Flow ($Nm^3/hr$) | 28,000 |
| Nominal CO Product Flow ($Nm^3/hr$) | 10,000 |
| Pressure (psia) | 150 |
| $CH_4$ Level (ppm) | 5 |
| $H_2$ Level (ppm) | 50 |
| Nominal $H_2$ Product Flow ($Nm^3/hr$) | 18,000 |
| Pressure (psia) | 600 |
| Key Pressures (psia) | |
| PSA Off-gas | 23 |
| GAN ex box | 20 |
| Fuel ex box | >20 |
| Compressor Cooler Temp (F.) | 100 |

TABLE 2

Refrigeration Option Performance Comparison

| Cycle | Impure CO-1 | Impure CO-2 | Base $H_2$ | Base LIN |
|---|---|---|---|---|
| PFD Reference | FIG. 1 | FIG. 1 | FIG. 2 | FIG. 3 |
| Estimated Capital Equivalent Operating Cost $ million | 3.63 | 3.54 | 3.61 | 4.05 |
| Est. capital saving vs base $ million | 0.70 | 0.50 | — | 1.10 |
| LIN Use MTD | 5.1 | 1.9 | 0 | 10.4 |
| Syngas compressor power hp | 1504 | 1541 | 1613 | 1631 |
| CO compressor power hp | 1116 | 1255 | 1018 | 926 |
| $H_2$ compressor power hp | 281 | 281 | 740 | 281 |
| Total power hp | 2901 | 3077 | 3371 | 2838 |
| Heavies removal column pressure psia | 40 | 40 | 45 | 49 |
| $H_2$ column pressure psia | 138 | 144 | 146 | 143 |
| PSA feed pressure psia | 482 | 482 | 339 | 482 |
| $H_2$ in PSA feed gas % | 92.5 | 92.4 | 94.2 | 92.5 |
| Expander process fluid | 99.2% CO | 99.2% CO | 94.2% $H_2$ | — |
| Expander power hp | 30 | 45 | 60 | — |
| Expander inlet pressure psia | 84 | 92 | 491 | — |
| Expander discharge pressure psia | 44 | 45 | 350 | — |
| Combined cold box feed $H_2/CO$ | 1.48 | 1.47 | 1.55 | 1.42 |

The optimized capital equivalent operating cost for the first example of the impure carbon monoxide expander (Impure carbon monoxide—1) is within $0.05 million of the existing hydrogen-rich expander technology while the capital for the impure expander is roughly $0.7 million lower as shown in Table 2. The similar operating cost comes from the trade between LIN use and power with 5.1 metric tons per day (MTD) LIN and 2901 hp compressor power for the impure carbon monoxide expander vs. 3371 hp compressor power for the hydrogen expander system. But, because of the 15% smaller, and therefore cheaper compression equipment, the cheaper expander, and the elimination of a separator pot, the capital cost of the first embodiment is lower than the base case.

A second example to reduce LIN consumption has the same flow sheet as the first but the operating conditions are modified to allow the medium pressure carbon monoxide reflux stream to condense against a larger vaporizing expander feed flow in the cold part of the main exchanger core. This entails varying the compressor interstage pressure to the maximum first stage ratio for an oil lubricated carbon monoxide reciprocating machine of ~3.3. The resulting $3.54 million capital equivalent operating cost shown in Table 2 for the second embodiment (Impure carbon monoxide—2) is ~2% better than the base $H_2$ expander case while estimated capital cost is ~$0.50 million lower.

The equivalent operating cost improvement comes from the lower compressor power of 3077 hp and the low LIN use of 1.9 MTD. FIG. 6 shows the improved overall efficiency of this operation relative to the base case in FIG. 4. The higher pressure carbon monoxide reflux stream increased the carbon monoxide compressor power from ~1100 to ~1250 hp, allowing the expander power to rise from 30 to 45 hp and the LIN use to fall from 5.1 to 1.9 MTD.

The estimated capital cost is lower because of the 9% lower compression requirement combined with additional expander and separator pot savings relative to the existing hydrogen-rich expander technology.

Overall, this competes relatively closely with the first impure carbon monoxide expander option, but should be favored in higher LIN cost situations.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. A process for obtaining purified carbon monoxide from a gaseous mixture consisting essentially of hydrogen and carbon monoxide and one or more additional impurities to be removed by one or more vapor-liquid separation devices downstream, comprising the steps of:

(a) providing a feed stream of the gaseous mixture;
(b) cooling and partially condensing the feed stream of the gaseous mixture to partially separate the feed stream of the gaseous mixture into at least one hydrogen rich vapor substream and at least one carbon monoxide rich liquid substream;
(c) withdrawing a first and a second substream from any one or more of the at least one carbon monoxide rich substreams;
(d) passing the first substream through a first expansion valve to let down the pressure in the first substream to a pressure nominally the same as that of a first one of the one or more vapor-liquid separation devices downstream;
(e) vaporizing the second substream using a heat exchange device to produce a third substream at a pressure substantially above that of the first one of the one or more vapor-liquid separation devices;
(f) passing the third substream through a work extraction device to provide a substantial portion of all refrigeration for cooling for the process;
(g) subsequently feeding the third substream to the first one of the one or more vapor-liquid separation devices; and
(h) withdrawing substantially purified carbon monoxide from any one or more of the one or more vapor-liquid separation devices.

2. A process for obtaining purified carbon monoxide from a gaseous mixture according to claim 1, where the first substream is vaporized using a heat exchange device subsequent to passing the first substream through the first expansion valve, and prior to introduction of the first substream into any downstream vapor liquid-separation device.

3. A process for obtaining purified carbon monoxide from a gaseous mixture according to claim 1, including the step of substantially reducing the hydrogen concentration of at least a portion of one of the at least one carbon monoxide rich liquid substreams, subsequent to the step of cooling and partially condensing the feed stream of the gaseous mixture.

4. A process for obtaining purified carbon monoxide from a gaseous mixture according to claim 1, wherein the step of vaporizing the second substream using a heat exchange device, includes using an indirect heat exchange device.

5. A process for obtaining purified carbon monoxide from a gaseous mixture according to claim 1, wherein the step of passing the third substream through a work extraction device includes passing the third substream through a turbo expander.

6. A process for obtaining purified carbon monoxide from a gaseous mixture according to claim 1, wherein the step utilizing the first one of the one or more vapor-liquid separation devices includes utilizing a distillation column as the vapor-liquid separation device.

7. A process for obtaining purified carbon monoxide from a gaseous mixture according to claim 1, wherein the step of withdrawing the first and the second substream from any one or more of the at least one carbon monoxide rich substreams includes forming the first and second substreams from a single one of the at least one carbon monoxide rich substreams.

8. A process for obtaining purified carbon monoxide from a gaseous mixture according to claim 1, including the step of passing the second substream through a second expansion valve to let down the pressure of the second substream prior to the step of vaporizing the second substream.

9. A process for obtaining purified carbon monoxide from a gaseous mixture according to claim 1, including the step of obtaining and withdrawing purified hydrogen from the hydrogen rich vapor substream.

10. A process for obtaining purified carbon monoxide from a gaseous mixture according to claim 9, including the step of purifying at least a portion of the hydrogen rich vapor substream in a hydrogen purification unit.

11. A process for obtaining purified carbon monoxide from a gaseous mixture according to claim 10, wherein the step of purifying at least a portion of the hydrogen rich vapor substream in a hydrogen purification unit includes purifying at least a portion of the hydrogen rich vapor substream in a pressure swing adsorption unit.

12. A process for obtaining purified carbon monoxide from a gaseous mixture according to claim 1, including the step of removing water, carbon dioxide and other freezable components prior to the step of cooling and partially condensing the feed stream of the gaseous mixture.

13. A process for obtaining purified carbon monoxide from a gaseous mixture according to claim 1, wherein the step utilizing the first one of the one or more vapor-liquid separation device includes utilizing a heavy component removal column.

14. A process for obtaining purified carbon monoxide from a gaseous mixture according to claim 1, wherein the step utilizing the first one of the one or more vapor-liquid separation device utilizes a heavy component removal column and wherein the process further includes the step of providing a light component removal column downstream from the heavy component removal column.

15. A process for obtaining purified carbon monoxide from a gaseous mixture according to claim 1, wherein the step utilizing the first one of the one or more vapor-liquid separation device includes utilizing a light component removal column.

16. A process for obtaining purified carbon monoxide from a gaseous mixture according to claim 1, wherein the step using a vapor-liquid separation device includes using a light component removal column and further includes a step of providing a heavy component removal column downstream from the light component removal column.

17. A process for obtaining purified carbon monoxide from a gaseous mixture according to claim 1, including a step of providing an additional stream of a refrigerant to provide additional refrigeration required by the process.

18. A process for obtaining purified carbon monoxide from a gaseous mixture according to claim 1, wherein the step of vaporizing the second substream in a heat exchange device to produce a third substream includes vaporizing the second substream to produce the third substream at a pressure at least 10 percent greater than the first one of the one or more vapor-liquid separation devices.

19. A process for obtaining purified carbon monoxide from a gaseous mixture according to claim 1, wherein the step of vaporizing the second substream in a heat exchange device to produce a third substream includes vaporizing the second substream to produce the third substream at a pressure at least 50 percent greater than the first one of the one or more vapor-liquid separation devices.

20. A process for obtaining purified carbon monoxide from a gaseous mixture consisting essentially of hydrogen and carbon monoxide and one or more additional impurities to be removed by one or more vapor-liquid separation devices, comprising the steps of:
(a) providing a feed stream of the gaseous mixture;
(b) cooling and partially condensing the feed stream of the gaseous mixture to partially separate the feed stream of the gaseous mixture into at least one hydrogen rich vapor substream and at least one carbon monoxide rich liquid substream;

(c) substantially reducing the hydrogen concentration of at least a portion of at least one of the at least one carbon monoxide rich liquid substreams;

(d) withdrawing a first and a second substream from any one of the at least one carbon monoxide rich substreams;

(e) passing the first substream through a first expansion valve to let down the pressure in the first substream to a pressure nominally the same as that of a first one of the one or more vapor-liquid separation devices downstream;

(f) vaporizing the first substream using a heat exchange device subsequent to passing the first substream through the first expansion valve, and prior to introduction of the first substream into any downstream vapor liquid-separation device;

(g) vaporizing the second substream using a heat exchange device to produce a third substream at a pressure substantially above that of the first one of the one or more vapor-liquid separation devices;

(h) passing the third substream through a work extraction device to provide a substantial portion of all refrigeration for cooling for the process;

(i) subsequently feeding the third substream to the first one of the one or more vapor-liquid separation devices; and (j) withdrawing substantially purified carbon monoxide from any one or more of the one or more vapor-liquid separation devices.

21. An apparatus for obtaining purified carbon monoxide from a gaseous mixture consisting essentially of hydrogen and carbon monoxide and one or more additional impurities to be removed by one or more vapor-liquid separation devices downstream, the apparatus comprising:

(a) means for providing a feed stream of the gaseous mixture;

(b) means for cooling and partially condensing the feed stream of the gaseous mixture to partially separate the feed stream of the gaseous mixture into at least one hydrogen rich vapor substream and at least one carbon monoxide rich liquid substream;

(c) means for withdrawing a first and a second substream from any one or more of the at least one carbon monoxide rich substreams;

(d) a first expansion valve through which the first substream is passed, adapted to let down the pressure in the first substream to a pressure nominally the same as that of a first one of the one or more vapor-liquid separation devices downstream;

(e) a heat exchange device for vaporizing the second substream adapted to produce a third substream at a pressure substantially above that of the first one of the one or more vapor-liquid separation devices;

(f) a work extraction device adapted to pass the third substream therethrough and adapted to provide a substantial portion of all refrigeration for cooling for the process;

(g) means adapted to feed the third substream to the first one of the one or more vapor-liquid separation devices downstream of the work extraction device; and (h) means to withdraw substantially purified carbon monoxide from any one or more of the one or more vapor-liquid separation devices.

22. An apparatus for obtaining purified carbon monoxide from a gaseous mixture according to claim 21, including a heat exchange device to vaporize the first substream downstream of the first expansion valve, and upstream of any vapor liquid-separation device into which the first substream is introduced.

23. An apparatus for obtaining purified carbon monoxide from a gaseous mixture according to claim 21, including means to substantially reduce the hydrogen concentration of at least a portion of one of the at least one carbon monoxide rich liquid substreams, downstream of the means for cooling and partially condensing the feed stream of the gaseous mixture.

24. An apparatus for obtaining purified carbon monoxide from a gaseous mixture according to claim 21, wherein the heat exchange device for vaporizing the second substream is an indirect heat exchange device.

25. An apparatus for obtaining purified carbon monoxide from a gaseous mixture according to claim 21, wherein the work extraction device is a turbo expander.

26. An apparatus for obtaining purified carbon monoxide from a gaseous mixture according to claim 21, wherein the first one of the one or more vapor-liquid separation devices is a distillation column.

27. An apparatus for obtaining purified carbon monoxide from a gaseous mixture according to claim 21, wherein the means for withdrawing the first and the second substream from any one or more of the at least one carbon monoxide rich substreams includes a means for withdrawing the first and second substreams from a single one of the at least one carbon monoxide rich substreams.

28. An apparatus for obtaining purified carbon monoxide from a gaseous mixture according to claim 21, including a second expansion valve through which the second substream is adapted to pass to let down the pressure of the second substream upstream of the heat exchange device for vaporizing the second substream.

29. An apparatus for obtaining purified carbon monoxide from a gaseous mixture according to claim 21, including means for obtaining and withdrawing purified hydrogen from the hydrogen rich vapor substream.

30. An apparatus for obtaining purified carbon monoxide from a gaseous mixture according to claim 29, wherein the means for obtaining and withdrawing purified hydrogen is a hydrogen purification unit for purifying at least a portion of the hydrogen rich vapor substream.

31. An apparatus for obtaining purified carbon monoxide from a gaseous mixture according to claim 30, wherein the hydrogen purification unit is adapted to purify at least a portion of the hydrogen rich vapor substream in a pressure swing adsorption unit.

32. An apparatus for obtaining purified carbon monoxide from a gaseous mixture according to claim 21, including means for removing water, carbon dioxide and other freezable components upstream of the means for cooling and partially condensing the feed stream of the gaseous mixture.

33. An apparatus for obtaining purified carbon monoxide from a gaseous mixture according to claim 21, wherein the first one of the one or more vapor-liquid separation devices is a heavy component removal column.

34. An apparatus for obtaining purified carbon monoxide from a gaseous mixture according to claim 21, wherein the first one of the one or more vapor-liquid separation devices is a heavy component removal column and the apparatus further includes a light component removal column downstream from the heavy component removal column.

35. An apparatus for obtaining purified carbon monoxide from a gaseous mixture according to claim 21, wherein the first one of the one or more vapor-liquid separation device is a light component removal column.

36. An apparatus for obtaining purified carbon monoxide from a gaseous mixture according to claim 21, wherein the vapor-liquid separation device is a light component removal column and the apparatus further includes a heavy component removal column downstream from the light component removal column.

37. An apparatus for obtaining purified carbon monoxide from a gaseous mixture according to claim 21, including means for providing an additional stream of a refrigerant to provide additional refrigeration required by the apparatus.

38. An apparatus for obtaining purified carbon monoxide from a gaseous mixture according to claim 21, wherein the heat exchange device that produces a third substream is adapted to vaporize the second substream to produce the third substream at a pressure at least 10 percent greater than the first one of the one or more vapor-liquid separation devices.

39. An apparatus for obtaining purified carbon monoxide from a gaseous mixture according to claim 21, wherein the heat exchange device that produces a third substream is adapted to vaporize the second substream to produce the third substream at a pressure at least 50 percent greater than the first one of the one or more vapor-liquid separation devices.

40. An apparatus for obtaining purified carbon monoxide from a gaseous mixture consisting essentially of hydrogen and carbon monoxide and one or more additional impurities to be removed by one or more vapor-liquid separation devices downstream, comprising:

(a) means for providing a feed stream of the gaseous mixture;

(b) means for cooling and partially condensing the feed stream of the gaseous mixture to partially separate the feed stream of the gaseous mixture into at least one hydrogen rich vapor substream and at least one carbon monoxide rich liquid substream;

(c) means for substantially reducing the hydrogen concentration of at least a portion of at least one of the at least one carbon monoxide rich liquid substreams, (d) means for withdrawing a first and a second substream from any one of the at least one carbon monoxide rich substreams;

(e) a first expansion valve through which the first substream is passed to let down the pressure in the first substream to a pressure nominally the same as that of a first one of the one or more vapor-liquid separation devices downstream;

(f) a heat exchange device for vaporizing the first substream downstream of the first expansion valve, and upstream of any downstream vapor liquid-separation devices;

(g) a heat exchange device for vaporizing the second substream to produce a third substream at a pressure substantially above that of the first one of the one or more vapor-liquid separation devices;

(h) a work extraction device adapted to pass the third substream therethrough to provide a substantial portion of all refrigeration for cooling for the process;

(i) means to feed the third substream to the first one of the one or more vapor-liquid separation devices; and (j) means for withdrawing substantially purified carbon monoxide from any one or more of the one or more vapor-liquid separation devices.

* * * * *

UNITED STATES PATENT AND TRADEMARK OFFICE
CERTIFICATE OF CORRECTION

PATENT NO. : 6,266,976 B1
DATED : July 31, 2001
INVENTOR(S) : Eric William Scharpf It is certified that error appears in the above-identified patent and that said Letters Patent is hereby corrected as shown below:

<u>Column 14,</u>
Line 3, cancel "pufified" and insert -- purified -- carbon.

Signed and Sealed this

Seventh Day of May, 2002

Attest:

Attesting Officer

JAMES E. ROGAN
Director of the United States Patent and Trademark Office